(12) United States Patent
Shin et al.

(10) Patent No.: US 11,394,048 B2
(45) Date of Patent: *Jul. 19, 2022

(54) REGENERATED LITHIUM-ION CATHODE MATERIALS HAVING MODIFIED SURFACES

(71) Applicant: Nissan North America, Inc., Franklin, TN (US)

(72) Inventors: Hosop Shin, Carmel, IN (US); Taehee Han, West Bloomfield, MI (US)

(73) Assignee: Nissan North America, Inc., Franklin, TN (US)

( * ) Notice: Subject to any disclaimer, the term of this patent is extended or adjusted under 35 U.S.C. 154(b) by 162 days.

This patent is subject to a terminal disclaimer.

(21) Appl. No.: 16/987,853

(22) Filed: Aug. 7, 2020

(65) Prior Publication Data

US 2020/0373610 A1 Nov. 26, 2020

Related U.S. Application Data

(63) Continuation of application No. 16/177,040, filed on Oct. 31, 2018, now Pat. No. 10,777,843.

(51) Int. Cl.
*H01M 10/0525* (2010.01)
*H01M 4/131* (2010.01)
(Continued)

(52) U.S. Cl.
CPC ....... *H01M 10/0525* (2013.01); *H01M 4/131* (2013.01); *H01M 4/366* (2013.01);
(Continued)

(58) Field of Classification Search
CPC .............................. H01M 4/366; H01M 4/131
See application file for complete search history.

(56) References Cited

U.S. PATENT DOCUMENTS 7,275,985 B2 10/2007 Lewis et al.
10,529,985 B2 1/2020 Oh et al.
(Continued)

FOREIGN PATENT DOCUMENTS

| JP | H10316031 A | 12/1998 |
| JP | 2011240797 A | 12/2011 |
| JP | 2015151073 A | 8/2015 |

OTHER PUBLICATIONS

Zheng, J. M., et al., The Effects of AlF3 Coating on the Performance of Li[Li0.2Mn0.54Ni0.13Co0.13]O2 Positive Electrode Material for Lithium-Ion Battery, Journal of The Electrochemical Society, 2008, pp. A775-A782, vol. 155(10).

*Primary Examiner* — Stewart A Fraser
(74) *Attorney, Agent, or Firm* — Young Basile Hanlon & MacFarlane, P.C.

(57) ABSTRACT

A regenerated cathode active material comprises a core material comprising lithium and a transition metal oxide, the core material having a surface, wherein the core material is a recycled cathode active material. At least two different lithium-ion conducting species are on the surface of the core material, and the at least two different lithium-ion conducting species are selected from $AlF_3$, $Li_3PO_4$, and a lithium metal oxide. Another regenerated cathode active material for use in a lithium-ion battery comprises a core material comprising a transition metal oxide and lithium, the core material having a surface, and multiple lithium-ion conducting species on the surface, wherein the core material is a recycled cathode active material.

20 Claims, 3 Drawing Sheets

(51) Int. Cl.
  *H01M 10/42*    (2006.01)
  *H01M 4/36*    (2006.01)
  *H01M 4/02*    (2006.01)

(52) U.S. Cl.
  CPC .. *H01M 10/4242* (2013.01); *H01M 2004/027* (2013.01); *H01M 2220/20* (2013.01)

(56) References Cited

U.S. PATENT DOCUMENTS

| | | |
|---|---|---|
| 10,581,071 B2 | 3/2020 | You et al. |
| 10,777,843 B2 * | 9/2020 | Shin ..................... H01M 4/525 |
| 2003/0183317 A1 | 10/2003 | Czaplicki et al. |
| 2012/0187723 A1 | 7/2012 | Bergholtz et al. |
| 2014/0017987 A1 | 1/2014 | Andersson |
| 2017/0207443 A1 | 7/2017 | Shen et al. |
| 2017/0222221 A1 | 8/2017 | Park et al. |
| 2017/0232820 A1 | 8/2017 | Mitch et al. |
| 2019/0140265 A1 | 5/2019 | Miara et al. |

* cited by examiner

REGENERATED LITHIUM-ION CATHODE MATERIALS HAVING MODIFIED SURFACES

CROSS-REFERENCE TO RELATED APPLICATION(S)

This application is a continuation of U.S. application patent Ser. No. 16/177,040, filed Oct. 31, 2018, the entire disclosure of which is hereby incorporated by reference.

TECHNICAL FIELD

This disclosure relates to regenerated lithium-ion cathode materials having modified surfaces enabling reuse of the cathode material.

BACKGROUND

Due to increasing demand of lithium-ion batteries for electric vehicles (EVs) and hybrid electric vehicles (HEV), the lithium-ion battery market is expected to grow rapidly in the next decade. Valuable metals are used in the cathode active materials of these batteries. The price of cathode active materials has been increasing due to the depletion of resources like cobalt, nickel and lithium.

The increased demand of EVs and HEVs will lead to a significant increase in end-of-life (EOL) batteries. Therefore, there is interest in recycling the material in these EOL batteries. Traditional recycling techniques (such as pyrometallurgy and hydro-metallurgy) use smelting or leaching processes which eventually result in recovering valuable metals and materials and the recovered metals can be potentially used for resynthesizing new cathode active materials or for other purposes. However, these traditional recycling techniques are neither environmentally friendly nor cost-effective.

SUMMARY

Disclosed herein are embodiments of a regenerated cathode active material for use in a lithium-ion battery. The regenerated cathode active material comprises a core material comprising lithium and a transition metal oxide, the core material having a surface, wherein the core material is a recycled cathode active material that has been re-lithiated. At least two different lithium-ion conducting species are on the surface of the core material. The at least two different lithium-ion conducting species are selected from $AlF_3$, $Li_3PO_4$, and a lithium metal oxide.

Another embodiment of a regenerated cathode active material for use in a lithium-ion battery comprises a core material comprising a transition metal oxide and lithium, the core material having a surface, and multiple lithium-ion conducting species on the surface, wherein the core material is a recycled cathode active material that has been re-lithiated.

Also disclosed are methods of producing a regenerated cathode active material for a lithium ion battery. An exemplary method comprises using a cathode active material removed from an end-of-life lithium-ion battery, recycled with a direct recycling process, and re-lithiated. The cathode active material is comprised of a core material having a surface on which organic species and inorganic species exist, the inorganic species selected from LiOH, $Li_2CO_3$, $Li_2O$ and LiF. The cathode active material is rinsed with a solvent to remove the organic species from the surface of the cathode active material. After removing the organic species, either the cathode active material is heated to a temperature of $\geq 700°$ C. and $\leq 1000°$ C. in a hydrogen atmosphere to convert LiOH to $Li_2O$ and reacted with carbon dioxide at a temperature of $\geq 400°$ C. and $\leq 700°$ C. to convert $Li_2O$ to $Li_2CO_3$, resulting in the cathode active material having $Li_2CO_3$ and LiF as most or all remaining inorganic species, or the LiOH and $Li_2O$ are removed from the surface by dissolving in water, resulting in the cathode active material having $Li_2CO_3$ and LiF as most or all remaining inorganic species. The $Li_2CO_3$ and LiF are converted to lithium-ion conducting species by reacting with one or more of aluminum, a metal oxide and a phosphate using a solid-state reaction.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Due to the increasing demand of lithium-ion batteries for HEVs, EVs, consumer electronics, and renewable energy storage systems, it is estimated that more than 340,000 ton/year of spent lithium-ion batteries needs to be recycled or properly disposed. Traditional metal recycling processes may produce recycled elemental metals, but such conventional processes are not economical and not environmentally friendly. Because EOL batteries from EVs still retain about 80% of their initial capacity, recycling of these materials should be prioritized.

A recycling technique, known as a direct recycling process, offers the potential for greater environmental and economic savings. Direct recycling produces recycled electrode active materials rather than the elemental metals that are produced by hydro-metallurgy and pyro-metallurgy processes. These recycled electrode materials must be further processed (i.e., re-lithiated) to reinstate the electrochemical activity to produce ready-to-use electrode active materials. A short annealing process may precede the re-lithiation process to improve the crystallinity and structural defects of the recycled EOL electrode active material.

Figure 1:
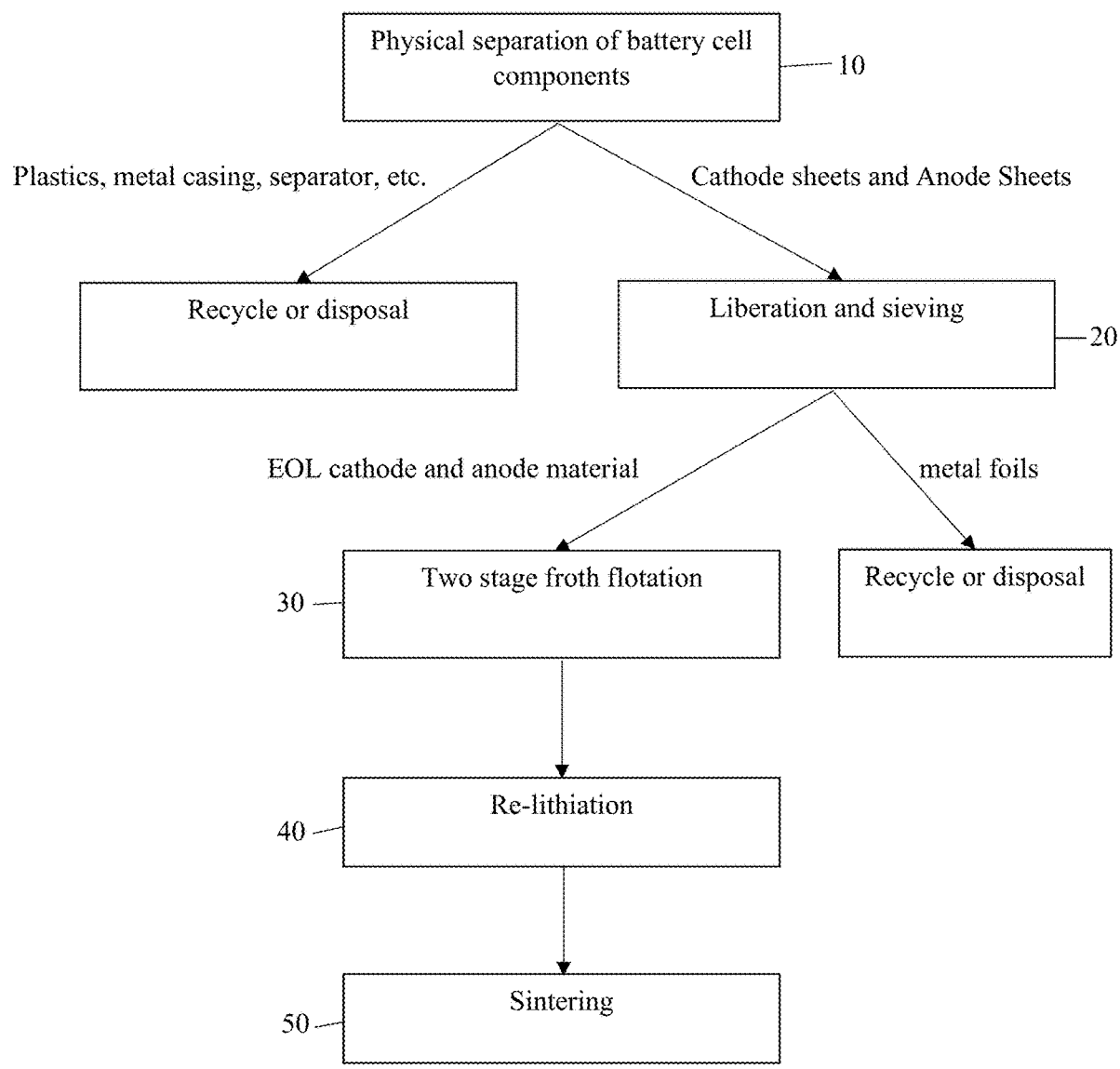
FIG. 1 is a flow diagram of a method of recycling cathode active material.

Electrode active materials recovered by the direct recycling process contain inorganic and organic chemical species on the surface due to battery cycling under various conditions and electrolyte decomposition, which are not removed during the direct recycling process. Organic and inorganic chemical species can also be formed due to chemical reactions that occur during the recycling process. The current direct recycling process is illustrated in FIG. 1 and involves physical separation of the battery cell materials in step 10, liberation and sieving of the cathode and anode materials in step 20, and two stage froth flotation in step 30 to separate the cathode material from the anode material.

The separated cathode material is re-lithiated in step 40 for reuse as active cathode material. Further, a sintering step 50 may be performed to improve the physical structure of the material.

The surface impurities or impure surface layers on the electrode active material cannot be removed or purified by the current direct recycling process. EOL cathode active material is primarily covered by inorganic species such as $LiOH$, $Li_2O$, $Li_2CO_3$, and $LiF$ and organic species such as alkoxides (ROLi), carboxylates (LiO—C=O), alcohols (R—OH), and semi-organic carbonates (RC(=O)OLi). Typically, inorganic species have very resistive characteristics, thereby significantly contributing to cell resistance. Organic species can be dissolved or removed by soaking or rinsing with dimethyl carbonate (DMC), diethyl carbonate (DEC), ethyl methyl carbonate (EMC), 1,2-dimeth-oxy-ethane (DME), etc. However, inorganic species cannot be dissolved or removed easily during the recycling process.

These surface impurities or impure surface layers lead to limited electrochemical performance compared with a virgin electrode active material. The battery cell made by the recycled electrode active material shows a very high cell resistance and electrode polarization, thereby diminishing the overall efficiency of the battery when compared with a virgin (unused) electrode active material. This makes the use of recycled electrode material unappealing.

Proposed herein are recycled electrode active materials having modified surfaces so that battery performance is not a disadvantage when compared with virgin electrode active material. In particular, the materials and processes herein focus on recycled cathode active material for lithium-ion batteries.

The processes and materials herein convert the inorganic species to species that enhance the electrochemical performance of the cathode active material. The recycled cathode active material is regenerated or re-functionalized with lithium-conducting species. The regenerated cathode active material, when used in a battery, compared to recycled cathode active material, reduces cell resistance, has better rate capability, and has longer-term durability (i.e., cyclability). When the regenerated cathode active material is used in a solid-state battery, interfacial resistance between cathode particles and solid electrolyte particles is reduced due to the layer of multiple lithium-ion conductors on the regenerated cathode active material. The regenerated cathode active material has better surface structure stability due to the surrounding multiple lithium-ion conductors. The multiple lithium-ion conductors protect the core of the regenerated cathode active material from severe etching/corrosion by the acidic species in the electrolyte, as well as reducing oxidation of the electrolyte at high voltage. Thus, the regenerated cathode active material can be adopted for use in high-voltage battery cells. The method of regeneration proposed herein is environmentally friendly and cost-effective, compared to traditional recycling techniques.

As disclosed herein, a regenerated cathode active material for use in a lithium-ion battery comprises a core material comprising a transition metal oxide and lithium, the core material having a surface, and multiple lithium-ion conducting species on the surface, wherein the core material is a recycled cathode active material that has been re-lithiated. The core material can be any cathode active material known to those skilled in the art for use in a lithium-ion battery, such as $LiCoO_2$, $LiMn_2O_4$, $LiMnO_2$, $LiNiO_2$, $LiFePO_4$, $LiNiCoMnO_2$, $LiNiCoAlO_2$, and $LiNi_{0.5}Mn_{1.5}O_4$ as non-limiting examples.

Figure 2:
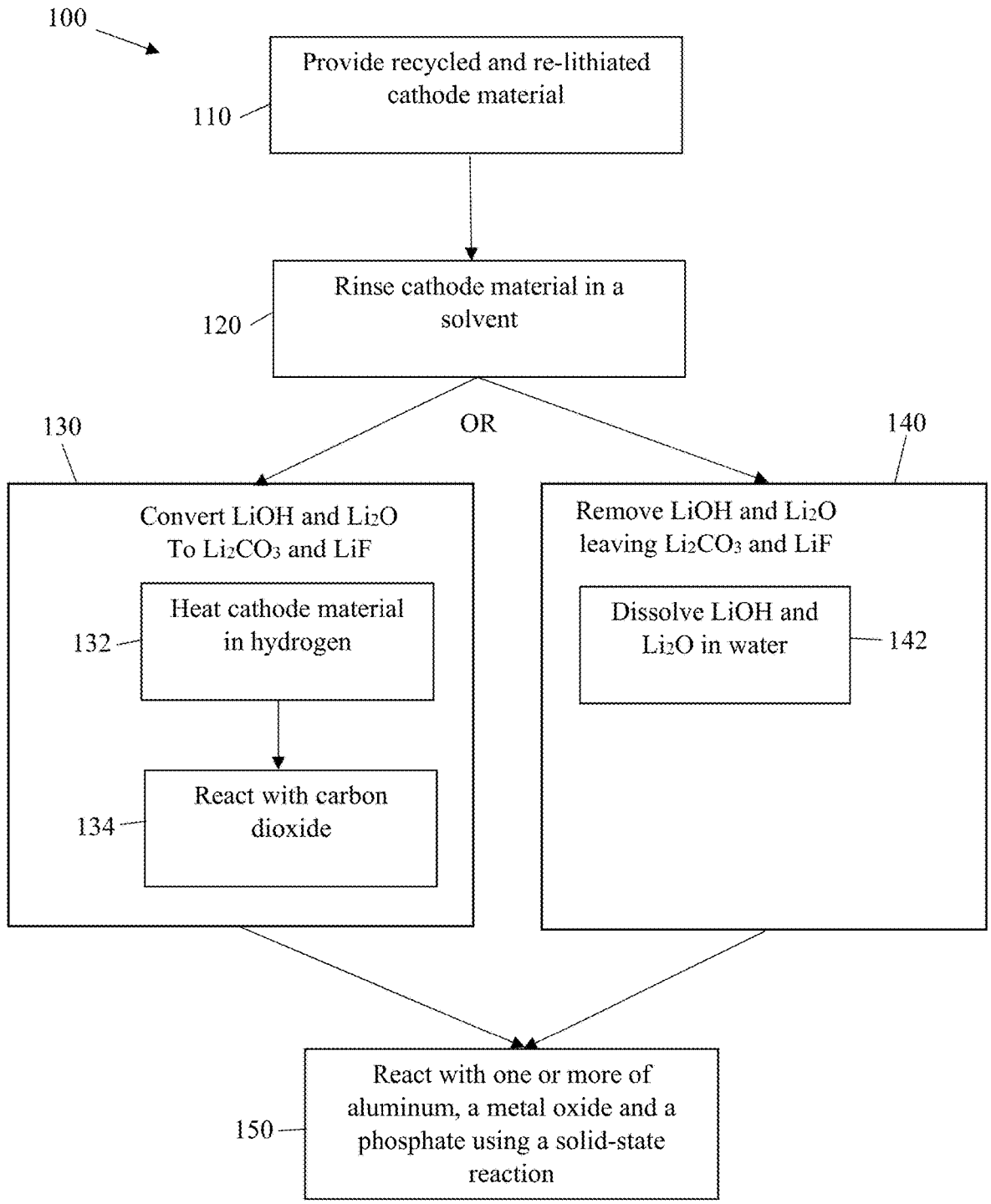
FIG. 2 is a flow diagram of a method of regenerating recycled cathode active material as disclosed herein.

An exemplary method of making the regenerated cathode active materials disclosed herein is illustrated in FIG. 2. The method 100 is performed on a cathode active material removed from an end-of-life lithium-ion battery, recycled with a direct recycling process, and re-lithiated, as illustrated in FIG. 1. The cathode active material provided in step 110 is comprised of a core material having a surface on which organic species and inorganic species exist, the inorganic species selected from $LiOH$, $Li_2CO_3$, $Li_2O$ and $LiF$. The cathode active material is rinsed with a solvent in step 120 to remove the organic species from the surface of the cathode active material.

After removing the organic species, the inorganic species $LiOH$ and $Li_2O$ are either converted to $Li_2CO_3$ and $LiF$ in step 130 or removed in step 140, leaving only $Li_2CO_3$ and $LiF$. Step 130 can be performed by heating the cathode active material in step 132 to a temperature of $\geq 700°$ C. and $\leq 1000°$ C. in a hydrogen atmosphere to convert $LiOH$ to $Li_2O$ and then reacting with carbon dioxide in step 134 at a temperature of $\geq 400°$ C. and $\leq 700°$ C. to convert $Li_2O$ to $Li_2CO_3$, resulting in the cathode active material having $Li_2CO_3$ and $LiF$ as most or all remaining inorganic species. In step 140, the $LiOH$ and $Li_2O$ can be removed from the surface by dissolving in water in step 142, resulting in the cathode active material having $Li_2CO_3$ and $LiF$ as most or all remaining inorganic species. The $Li_2CO_3$ and $LiF$ are converted to lithium-ion conducting species in step 150 by reacting with one or more of aluminum, a metal oxide and a phosphate using a solid-state reaction. Step 150 is performed by selecting one or more of aluminum, the metal oxide and the phosphate as the converting material, forming a mixture by mixing the converting material with the cathode active material, wherein an amount of the converting material is 1.0 wt % to 5.0 wt % of the cathode active material and has a diameter of between 1.0 nm and 100 nm, inclusive and calcining the mixture at a temperature of between $\geq 600°$ C. and $\leq 1100°$ C. for a period of time.

Figure 3:
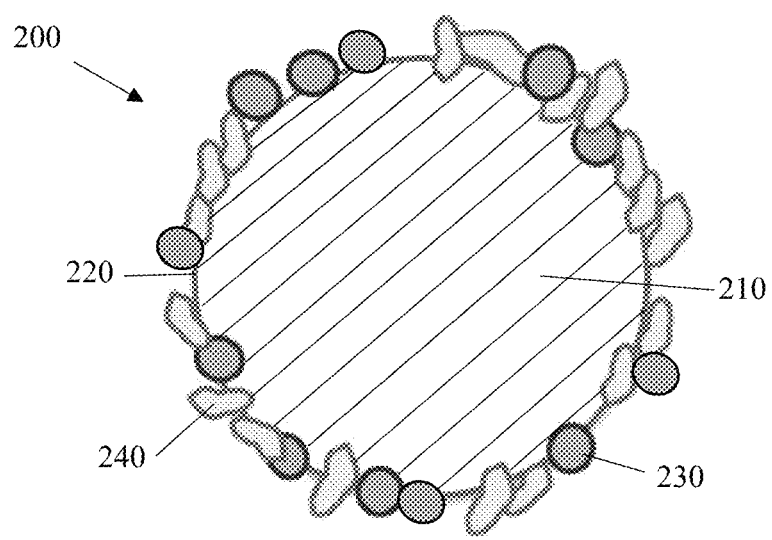
FIG. 3 is a cross-sectional schematic of a regenerated cathode active material as disclosed herein.

FIG. 3 is an example schematic of a regenerated cathode active material for use in a lithium-ion battery. The regenerated cathode active material 200 comprises a core material 210, shown in cross section, comprising lithium and a transition metal oxide. The core material is a recycled cathode active material that has been re-lithiated, such as the core of the material resulting from the process in FIG. 1, without the surface impurities. The core material has a surface 220 on which are at least two different lithium-ion conducting species 230, 240. The at least two different lithium-ion conducting species are selected from $AlF_3$, $Li_3PO_4$, and a lithium metal oxide.

The lithium-ion conducting species 230, 240 may cover any portion of the surface 220 of the core material 210. For example, the lithium-ion conducting species 230, 240 may cover a majority or the surface 210, or may cover nearly the entire surface 220, creating a so-called coating on the surface 220. The lithium-ion conducting species 230, 240 can be non-uniformly positioned on the core material 210 such that a portion of the surface 220 of the core material 210 is exposed.

The regenerated cathode active material 200 in FIG. 3 is provided for illustrative purposes and is not drawn to scale. The core material 210 can have a particle size ranging between 5.0 and 25.0 micron, inclusive, and the lithium-ion conducting species 230, 240 can have a particle size ranging between 1.0 nm and 100 nm, inclusive.

To produce a regenerated cathode active material 200 having lithium-ion conducting species of $AlF_3$ and a lithium metal oxide, in step 150, the $LiF$ is reacted with aluminum to produce $AlF_3$ and the $Li_2CO_3$ is reacted with a metal oxide to produce a lithium metal oxide. Examples of metal oxides include $SiO_2$, $Al_2O_3$, $ZrO_2$, or $TiO_2$ with the respective lithium metal oxide being $Li_4SiO_4$, $LiAlO_2$, $Li_2ZrO_3$, or $Li_2TiO_3$.

To produce a regenerated cathode active material 200 having lithium-ion conducting species of $AlF_3$ and $Li_3PO_4$ and a lithium metal oxide, in step 150, the LiF can be reacted with $AlPO_4$ to produce $AlF_3$ and $Li_3PO_4$ and the $Li_2CO_3$ is reacted with a metal oxide to produce a lithium metal oxide. Examples of metal oxides include $SiO_2$, $Al_2O_3$, $ZrO_2$, or $TiO_2$ with the respective lithium metal oxide being $Li_4SiO_4$, $LiAlO_2$, $Li_2ZrO_3$, or $Li_2TiO_3$.

To produce a regenerated cathode active material 200 having lithium-ion conducting species of $AlF_3$ and $Li_3PO_4$, in step 150, the LiF and the $Li_2CO_3$ can be reacted with $AlPO_4$ to produce $AlF_3$ and $Li_3PO_4$.

When removing LiOH and $Li_2O$ from the surface by dissolving in water, as in step 140, rather than converting LiOH and $Li_2O$ to additional LiF and $Li_2CO_3$ as in step 130, additional surface 220 of the core material 210 is exposed. Depending on the amount of LiOH and $Li_2O$ removed, the amount of exposed surface area will vary. To further increase the lithium-ion conduction, the exposed portions of the surface 220 can be coated with a lithium-ion conducting material. The additional coating can be a material that is the same or different from the lithium-ion conducting species. As non-limiting examples, the coating can be $Li_4SiO_4$, $LiAlO_2$, $Li_2ZrO_3$, $Li_2TiO_3$, $AlF_3$ and $Li_3PO_4$.

Figure 4:
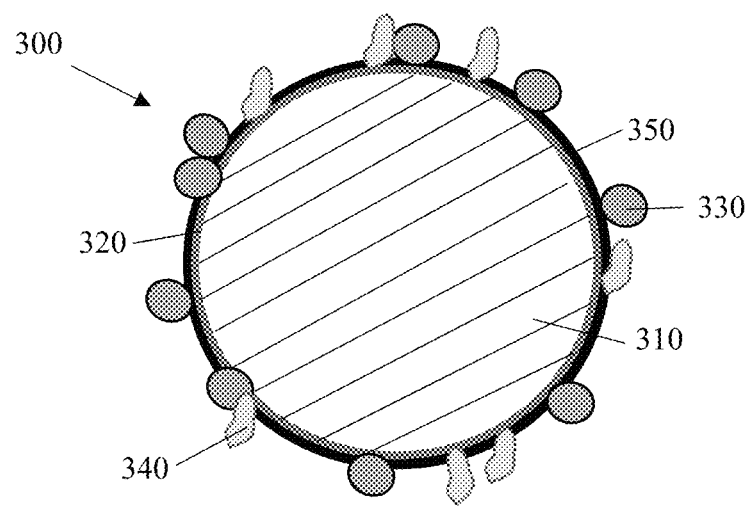
FIG. 4 is a cross-sectional schematic of another regenerated cathode active material as disclosed herein.

FIG. 4 is an example schematic of another regenerated cathode active material for use in a lithium-ion battery. The regenerated cathode active material 300 comprises a core material 310, shown in cross section, comprising lithium and a transition metal oxide. The core material is a recycled cathode active material that has been re-lithiated, such as the core of the material resulting from the process in FIG. 1, without the surface impurities. The core material has a surface 320 on which are at least two different lithium-ion conducting species 330, 340. The at least two different lithium-ion conducting species are selected from $AlF_3$, $Li_3PO_4$, and a lithium metal oxide. A lithium-ion conducting coating 350 is deposited on the surface 320 where there are no lithium-ion conducting species 330, 340.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A regenerated cathode active material for use in a lithium-ion battery, the regenerated cathode active material comprising:
    a core material comprising a recycled cathode active material comprising a transition metal oxide, the core material having a surface; and
    multiple lithium-ion conducting species on the surface.
2. The regenerated cathode active material of claim 1, wherein the multiple lithium-ion conducting species are selected from $AlF_3$, $Li_3PO_4$, and a lithium metal oxide.
3. The regenerated cathode active material of claim 1, wherein the core material further comprises lithium.
4. The regenerated cathode active material of claim 3, wherein the core material is one or more of $LiCoO_2$, $LiMn_2O_4$, $LiMnO_2$, $LiNiO_2$, $LiFePO_4$, $LiNiCoMnO_2$, $LiNiCoAlO_2$, and $LiNi_{0.5}Mn_{1.5}O_4$.
5. The regenerated cathode active material of claim 1, wherein the lithium-ion conducting species are $AlF_3$ and $Li_3PO_4$.
6. The regenerated cathode active material of claim 1, wherein the lithium-ion conducting species are $AlF_3$ and the lithium metal oxide.
7. The regenerated cathode active material of claim 6, wherein the lithium metal oxide is one of $Li_4SiO_4$, $LiAlO_2$, $Li_2ZrO_3$, and $Li_2TiO_3$.
8. The regenerated cathode active material of claim 1, wherein the multiple lithium-ion conducting species form a coating on the core material.
9. The regenerated cathode active material of claim 1, wherein the multiple lithium-ion conducting species are non-uniformly positioned on the core material such that a portion of the surface of the core material is exposed.
10. The regenerated cathode active material of claim 9, wherein the exposed portion of the core material has a coating comprising a lithium-ion conducting material.
11. A method of producing a regenerated cathode active material for a lithium ion battery, the method comprising:
    using cathode active material removed from an end-of-life lithium-ion battery and recycled, the cathode active material comprised of a core material of a transition metal oxide having a surface on which organic species and inorganic species exist, the inorganic species selected from LiOH, $Li_2CO_3$, $Li_2O$ and LiF;
    rinsing the cathode active material with a solvent to remove the organic species from the surface of the cathode active material;
    after removing the organic species, either:
        heating the cathode active material to a temperature of ≥700° C. and ≤1000° C. in a hydrogen atmosphere to convert LiOH to $Li_2O$; and
        reacting the cathode active material with carbon dioxide at a temperature of ≥400° C. and ≤700° C. to convert $Li_2O$ to $Li_2CO_3$, resulting in the cathode active material having $Li_2CO_3$ and LiF as most or all remaining inorganic species, or:
        removing LiOH and $Li_2O$ from the surface by dissolving in water, resulting in the cathode active material having $Li_2CO_3$ and LiF as most or all remaining inorganic species; and
    converting the $Li_2CO_3$ and LiF to lithium-ion conducting species by reacting with one or more of aluminum, a metal oxide and a phosphate using a solid-state reaction.
12. The method of claim 11, wherein converting $Li_2CO_3$ and LiF to lithium-ion conducting species comprises reacting the LiF with aluminum to produce $AlF_3$ and reacting $Li_2CO_3$ with a metal oxide to produce a lithium metal oxide.
13. The method of claim 12, wherein the metal oxide is $SiO_2$, $Al_2O_3$, $ZrO_2$, or $TiO_2$ and the lithium metal oxide is $Li_4SiO_4$, $LiAlO_2$, $Li_2ZrO_3$, or $Li_2TiO_3$, respectively.
14. The method of claim 11, wherein converting $Li_2CO_3$ and LiF to lithium-ion conducting species comprises reacting the LiF with $AlPO_4$ to produce $AlF_3$ and $Li_3PO_4$ and reacting $Li_2CO_3$ with a metal oxide to produce a lithium metal oxide.
15. The method of claim 14, wherein the metal oxide is $SiO_2$, $Al_2O_3$, $ZrO_2$, or $TiO_2$ and the lithium metal oxide is $Li_4SiO_4$, $LiAlO_2$, $Li_2ZrO_3$, or $Li_2TiO_3$, respectively.

16. The method of claim 11, wherein converting $Li_2CO_3$ and LiF to lithium-ion conducting species comprises reacting the LiF and the $Li_2CO_3$ with $AlPO_4$ to produce $AlF_3$ and $Li_3PO_4$.

17. The method of claim 11, wherein the cathode active material after re-lithiation is one of $LiCoO_2$, $LiMn_2O_4$, $LiMnO_2$, $LiNiO_2$, $LiFePO_4$, $LiNiCoMnO_2$, $LiNiCoAlO_2$, and $LiNi_{0.5}Mn_{1.5}O_4$.

18. The method of claim 11, wherein the solid-state reaction comprises:
- select the one or more of aluminum, the metal oxide and the phosphate as the converting material;
- form a mixture by mixing the converting material with the cathode active material, wherein an amount of the converting material is 1.0 wt % to 5.0 wt % of the cathode active material and has a diameter of between 1.0 nm and 100 nm, inclusive; and
- calcine the mixture at a temperature of between ≥600° C. and ≤1100° C. for a period of time.

19. The method of claim 11, wherein the lithium-ion conducting species form a coating on the core material.

20. The method of claim 11, wherein, when removing LiOH and $Li_2O$ from the surface by dissolving in water, the surface from which the LiOH and $Li_2O$ are removed is exposed, the method further comprising:
- coating exposed portions of the surface with a lithium-ion conducting material.

* * * * *